(12) United States Patent
Abe

(10) Patent No.: US 11,846,354 B2
(45) Date of Patent: Dec. 19, 2023

(54) SEALING DEVICE

(71) Applicant: NOK CORPORATION, Tokyo (JP)

(72) Inventor: Junichi Abe, Fukushima (JP)

(73) Assignee: NOK CORPORATION

( * ) Notice: Subject to any disclaimer, the term of this patent is extended or adjusted under 35 U.S.C. 154(b) by 0 days.

(21) Appl. No.: 17/627,291

(22) PCT Filed: Jul. 8, 2020

(86) PCT No.: PCT/JP2020/026712
§ 371 (c)(1),
(2) Date: Jan. 14, 2022

(87) PCT Pub. No.: WO2021/044726
PCT Pub. Date: Mar. 11, 2021

(65) Prior Publication Data
US 2022/0260157 A1 Aug. 18, 2022

(30) Foreign Application Priority Data

Sep. 4, 2019 (JP) ................................. 2019-161296

(51) Int. Cl.
*F16J 15/3204* (2016.01)
*F16J 15/3264* (2016.01)
*F16J 15/3284* (2016.01)

(52) U.S. Cl.
CPC ....... *F16J 15/3204* (2013.01); *F16J 15/3264* (2013.01); *F16J 15/3284* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 6,357,751 B1  3/2002 Rentschler
2010/0052266 A1  3/2010 Tanida et al.

FOREIGN PATENT DOCUMENTS

CN  101680549 A  3/2010
CN  102003535 A  4/2011
(Continued)

OTHER PUBLICATIONS

International Search Report (in English and Japanese) issued in PCT/JP2020/026712, dated Aug. 11, 2020; ISA/JP (5 pages).
(Continued)

*Primary Examiner* — Nathan Cumar
(74) *Attorney, Agent, or Firm* — Harness, Dickey & Pierce, P.L.C.

(57) ABSTRACT

Provided is a sealing device that can suppress the displacement of a protective ring. A sealing device includes an annular reinforcement ring around an axis x; an annular elastic portion around the axis x that is attached to the reinforcement ring, is formed of an elastic material, and includes a lip portion; and an annular protective ring around the axis x that is adapted to be fitted to an inner periphery side d the reinforcement ring. The reinforcement ring includes a reinforcement ring tubular portion formed in a tubular shape around the axis x. The protective ring includes a protective ring tubular portion formed in a tubular shape around the axis x, and an engagement portion that is provided on an outer peripheral surface of the protective ring tubular portion and is adapted to engage with the inner periphery side d of the reinforcement ring.

3 Claims, 2 Drawing Sheets

(58) Field of Classification Search
CPC .. F16J 15/3208; F16J 15/3212; F16J 15/3264;
F16J 15/3268; F16J 15/3292
USPC .......................................................... 277/351
See application file for complete search history.

(56) References Cited

FOREIGN PATENT DOCUMENTS

| | | | |
|---|---|---|---|
| CN | 201836385 | U | 5/2011 |
| CN | 202646711 | U | 1/2013 |
| CN | 102996808 | A | 3/2013 |
| CN | 105840831 | A | 8/2016 |
| CN | 207728885 | U | 8/2018 |
| CN | 208858929 | U | 5/2019 |
| DE | 19808280 | A1 | 9/1999 |
| EP | 2290271 | A1 | 3/2011 |
| IN | 105889518 | A | 8/2016 |
| JP | H10-331986 | A | 12/1998 |
| JP | 2006233992 | A * | 9/2006 |
| JP | 2010-112481 | A | 5/2010 |
| JP | 2019-044898 | A | 3/2019 |
| JP | 2019044898 | A * | 3/2019 |

OTHER PUBLICATIONS

International Preliminary Report on Patentability for corresponding International Application No. PCT/JP2020/026712 dated Mar. 8, 2022, with English translation (8 Pages).

Written Opinion of the International Searching Authority for corresponding International Application No. PCT/JP2020/026712 dated Aug. 11, 2020, with English translation (6 Pages).

Decision of Refusal issued in corresponding Japanese Patent Application No. 2021-543636 dated Jul. 11, 2023, with English translation (6 Pages).

Notice of Reasons for Refusal issued in corresponding Japanese Patent Application No. 2021-543636 dated Apr. 4, 2023, with English translation (7 Pages).

Extended European Search Report issued in corresponding European Application No. 20861426.3 dated Aug. 29, 2023 (9 Pages).

First Office Action issued in corresponding Chinese Patent Application No. 202080051001.2 dated Oct. 11, 2023, with English translation (15 Pages).

* cited by examiner

SEALING DEVICE

CROSS REFERENCE TO RELATED APPLICATIONS

This is the National Stage of International Application No. PCT/JP2020/026712, filed Jul. 8, 2020, which claims the benefit of Japanese Patent Application No. 2019-161296 filed Sep. 4, 2019, and the disclosure of which are hereby incorporated by reference in their entirety.

BACKGROUND

Technical Field

The present disclosure relates to a sealing device.

Related Art

Conventionally, among sealing devices, a sealing device has been known which is used for a rotating shaft of a construction machine, such as a power shovel or an arm crane, for example. Such a sealing device is sometimes provided with a metal protective ring fitted around a lip portion from the exterior side so as to prevent collision of foreign matter, such as stones, with the lip portion from the outside. Note that as a sealing device, there is disclosed the one that has a second metal ring fitted on the inner peripheral surface of an interior surface adhesion portion on the inner periphery side of a metal ring of an oil seal body with a predetermined fitting allowance, from one side in the axial direction (for example, see Japanese Patent Application Publication No. 2010-112481).

A protective ring squashes a portion on the inner periphery side of an elastic portion that is provided around a tubular portion of a reinforcement ring in a sealing device. The protective ring is held on the inner periphery side of the tubular portion with a repulsive force (i.e., a frictional force) of rubber generated as the elastic portion provided on the inner periphery side of the tubular portion is squashed.

However, in a conventional sealing device with a protective ring, when a greater-than-expected external force is applied to the protective ring, the protective ring may be displaced from a predetermined position.

The present disclosure has been made in view of the foregoing problem, and it is an object of the present disclosure to suppress the displacement of a protective ring in a sealing device.

SUMMARY

To achieve the aforementioned object, a sealing device according to the present disclosure includes an annular reinforcement ring around an axis; an annular elastic portion around the axis, the annular elastic portion being attached to the reinforcement ring, being formed of an elastic material, and including a lip portion; and an annular protective ring around the axis, the annular protective ring being adapted to be fitted to an inner periphery side of the reinforcement ring, in which the reinforcement ring includes a reinforcement ring tubular portion formed in a tubular shape around the axis, and the protective ring includes a protective ring tubular portion formed in a tubular shape around the axis, and an engagement portion provided on an outer peripheral surface of the protective ring tubular portion, the engagement portion being adapted to engage with the inner periphery side of the reinforcement ring.

In the sealing device according to an aspect of the present disclosure, the elastic portion includes a gasket portion attached to the reinforcement ring tubular portion, and the engagement portion is adapted to engage with the gasket portion on an inner periphery side of the reinforcement ring tubular portion.

In the sealing device according to an aspect of the present disclosure, the reinforcement ring includes a reinforcement ring disk portion extending from one end portion of the reinforcement ring tubular portion in a direction of the axis toward an inner periphery side, and the protective ring is adapted to be fitted to the inner periphery side of the reinforcement ring tubular portion from a side of another end portion of the reinforcement ring tubular portion in the direction of the axis.

In the sealing device according to an aspect of the present disclosure, the engagement portion is formed in a recessed groove shape on the outer peripheral surface of the protective ring tubular portion.

In the sealing device according to an aspect of the present disclosure, the engagement portion includes an upstanding wall portion on the outer peripheral surface of the protective ring tubular portion, the upstanding wall portion facing another side, and the upstanding wall portion is provided upright in a radial direction perpendicular to the direction of the axis.

Effects of Disclosure

With a sealing device according to the present disclosure, the displacement of a protective ring can be suppressed.

DETAILED DESCRIPTION

Hereinafter, a sealing device according to an embodiment of the present disclosure will be described with reference to the drawings.

Hereinafter, for convenience's sake of description, the direction of an arrow a (see FIG. 1) along the direction of an axis x shall be assumed as the exterior side, and the direction of an arrow b (see FIG. 1) along the direction of the axis x shall be assumed as the interior side. In addition, regarding the direction perpendicular to the axis x (hereinafter also referred to as a "radial direction"), a direction away from the axis x (i.e., the direction of an arrow c in FIG. 1) shall be assumed as the outer periphery side, and a direction toward the axis x (i.e., the direction of an arrow d in FIG. 1) shall be assumed as the inner periphery side.

Figure 1:
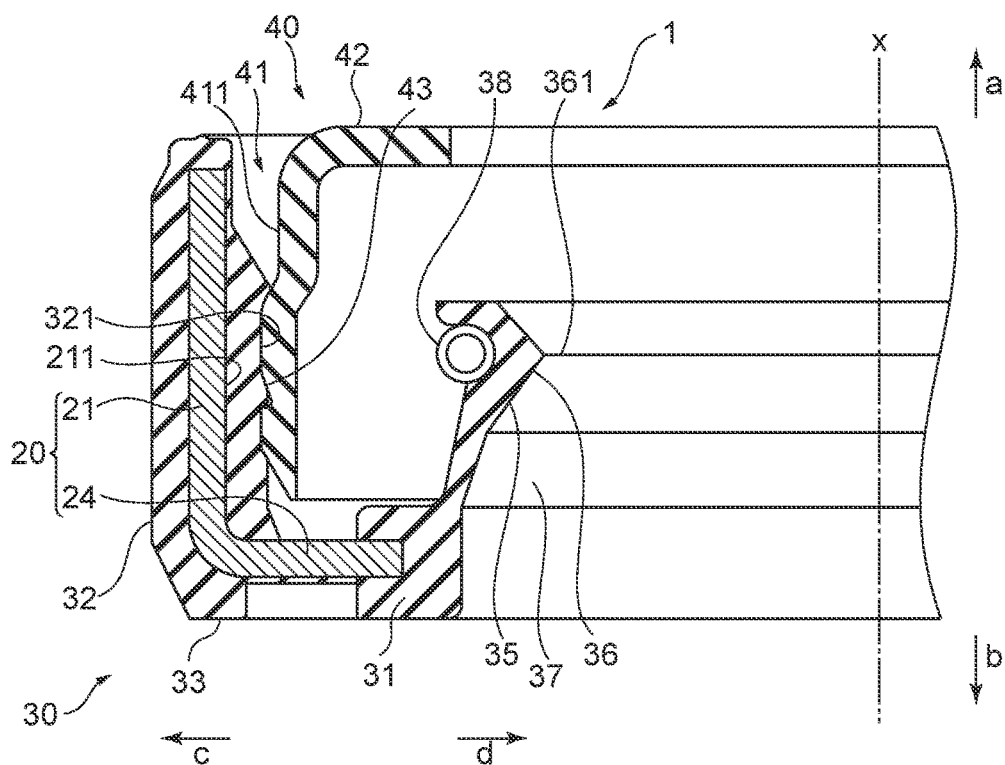
FIG. 1 is a sectional view of a cross-section along an axis for illustrating the schematic configuration of a sealing device according to an embodiment of the present disclosure.
Figure 2:
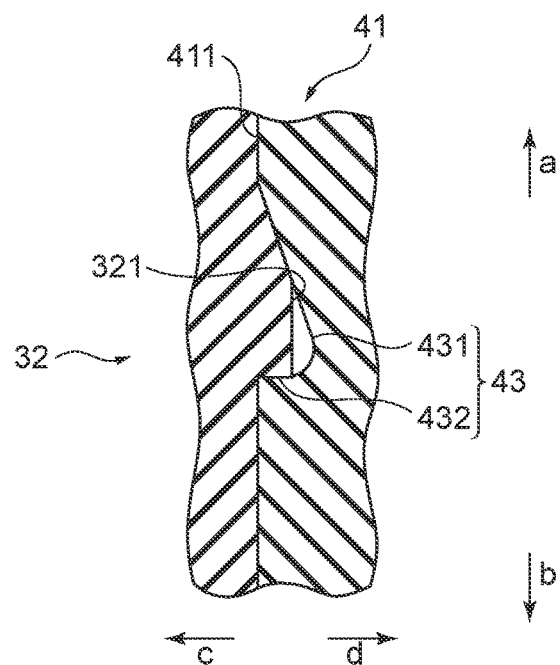
FIG. 2 is an enlarged sectional view of a cross-section along the axis for illustrating an engagement portion of the sealing device illustrated in FIG. 1.

FIG. 1 is a sectional view of a cross-section along the axis x for illustrating the schematic configuration of a sealing device 1 according to an embodiment of the present disclosure. In addition, FIG. 2 is an enlarged sectional view along the axis x for illustrating an engagement portion of the sealing device 1. The configuration of the sealing device 1 according to the present embodiment will be described with reference to FIGS. 1 and 2.

As illustrated in FIGS. 1 and 2, the sealing device 1 according to the present embodiment includes an annular reinforcement ring 20 around the axis x, an annular elastic portion 30 around the axis x that is formed of an elastic material and includes a lip portion 35, and an annular protective ring 40 around the axis x that is fitted on an inner periphery side d of the reinforcement ring 20. The elastic portion 30 is attached to the reinforcement ring 20. The reinforcement ring 20 includes a reinforcement ring tubular portion 21 formed in a tubular shape around the axis x. The protective ring 40 includes a protective ring tubular portion 41 formed in a tubular shape around the axis x, and an engagement portion 43 that is provided on an outer peripheral surface 411 of the protective ring tubular portion 41 and is adapted to engage with the inner periphery side d of the reinforcement ring 20. Hereinafter, the structure of the sealing device 1 will be specifically described.

The reinforcement ring 20 is an annular metal member having the axis x as the center or the approximate center as illustrated in FIG. 1. Examples of a metal member used for the reinforcement ring 20 include stainless steel and SPCC (cold rolled steel sheet). The reinforcement ring 20 is produced by subjecting such a metal member to press work or forging, for example. The reinforcement ring 20 includes the reinforcement ring tubular portion 21 that is a tubular portion having a cylindrical or approximately cylindrical shape and extending in the direction of the axis x, and a reinforcement ring disk portion 24 that is a hollow disk-like portion extending from one side of the reinforcement ring tubular portion 21, that is, from an end portion on an interior side b to the inner periphery side d, for example.

The reinforcement ring tubular portion 21 is formed to allow the sealing device 1 to be fitted to the inner peripheral surface of a through-hole in an attachment target (both not illustrated). The reinforcement ring tubular portion 21 is fittable to the inner peripheral surface of the through-hole by contacting it via the elastic portion 30. The reinforcement ring tubular portion 21 may be shaped such that its middle portion has a conical ring portion (not illustrated) formed thereon. Alternatively, the reinforcement ring tubular portion 21 may be fittable to the inner peripheral surface of the through-hole by partially and directly contacting it. The reinforcement ring tubular portion 21 is, when the sealing device 1 is fitted to the inner peripheral surface of the through-hole, fitted onto the inner peripheral surface of the through-hole such that the axis x of the sealing device 1 coincides with the axis x of a rotating shaft (not illustrated).

The reinforcement ring 20 has the elastic portion 30 attached thereto such that the elastic portion 30 covers the reinforcement ring 20 from the interior side (i.e., the direction of the arrow b) and the outer periphery side (i.e., the direction of the arrow c). That is, the reinforcement ring 20 reinforces the elastic portion 30.

The elastic portion 30 is attached to the reinforcement ring 20 as described above. The elastic portion 30 is formed integrally with the reinforcement ring 20 so as to cover the reinforcement ring 20. Examples of the elastic material for the elastic portion 30 include a variety of rubber materials. Examples of a variety of rubber materials include synthetic rubber, such as nitrile rubber (NBR), hydrogenated nitrile rubber (H-NBR), acrylic rubber (ACM), and fluorocarbon rubber (FKM). The elastic portion 30 is molded through cross-linking (or vulcanization) molding using a mold. During such cross-linking molding, the reinforcement ring 20 is disposed in the mold. The elastic portion 30 is bonded to the reinforcement ring 20 through cross-linking bonding, so that the elastic portion 30 and the reinforcement ring 20 are integrally molded. The elastic portion 30 includes a base portion 31, a gasket portion 32, a cover portion 33, the lip portion 35, and an inner peripheral surface 37.

The base portion 31 is located near an end portion of the reinforcement ring disk portion 24 on the inner periphery side (i.e., the direction of the arrow d). The base portion 31 slidably supports a lip tip end portion 36 of the lip portion 35 while pressing the lip tip end portion 36 against the outer peripheral surface of the rotating shaft. The reinforcement ring disk portion 24 is partially embedded in the base portion 31. The cover portion 33 is attached to the reinforcement ring disk portion 24 from the exterior side a as described above, and is provided such that it faces the exterior side a while having an annular shape around the axis x. The base portion 31 includes the inner peripheral surface 37 that is an annular surface located on the inner periphery side of the elastic portion 30.

The gasket portion 32 is a portion of the elastic portion 30 covering the reinforcement ring tubular portion 21 of the reinforcement ring 20 from the outer periphery side c and the inner periphery side d. The gasket portion 32 has an outside diameter that is equal to or slightly greater than the inside diameter of the inner peripheral surface of the through-hole. Therefore, when the sealing device 1 is fitted to the inner peripheral surface of the through-hole, the gasket portion 32 is radially compressed between the reinforcement ring tubular portion 21 of the reinforcement ring 20 and the through-hole, and thus seals a gap between the inner peripheral surface of the through-hole and the reinforcement ring tubular portion 21 of the reinforcement ring 20.

As the gasket portion 32 seals the gap between the inner peripheral surface of the through-hole and the reinforcement ring tubular portion of the reinforcement ring, the annular gap between the inner peripheral surface of the through-hole and the rotating shaft is sealed by the sealing device 1. Note that the gasket portion 32 is not limited to the one that entirely covers the outer periphery side c and the inner periphery side d of the reinforcement ring tubular portion 21 as illustrated in FIGS. 1 and 2. For example, the gasket portion 32 may be the one that partially covers the outer periphery side c and the inner periphery side d of the reinforcement ring tubular portion 21.

The cover portion 33 is a portion attached to the reinforcement ring disk portion 24 from the exterior side (i.e., the direction of the arrow a) at a position between the base portion 31 and the gasket portion 32.

The lip portion 35 of the elastic portion 30 includes, at its tip end extending from the base portion 31 along the axis x, the lip tip end portion 36 that is formed to allow the outer peripheral surface of the rotating shaft (not illustrated) to be slidable thereon. The lip tip end portion 36 protrudes to the inner periphery side (i.e., the direction of the arrow d). The lip portion 35 has a conical tubular shape such that its diameter decreases toward the inner periphery side d in the direction toward the exterior side (i.e., the direction of the arrow a) along the direction of the axis x. That is, the lip portion 35 extends diagonally with respect to the axis x from the base portion 31 to a lip contact end 361 of the lip tip end portion 36 on the exterior side (i.e., the direction of the arrow a) and the inner periphery side (i.e., the direction of the arrow d) as viewed in cross-section along the axis x (hereinafter also referred to as "cross-section"). The lip portion 35 is provided with a recessed part on the outer periphery side (i.e., the direction of the arrow c) opposite to the lip tip end portion 36. The recessed part has fitted therein a garter spring 38, which is an annular elastic member, as a tightening force provision member.

The lip tip end portion 36 is an annular portion having a cross-section in a wedge shape protruding to the inner periphery side (i.e., the direction of the arrow d). The lip tip end portion 36 has the lip contact end 361 adapted to slidably contact the outer peripheral surface of the rotating shaft.

The garter spring 38 is a metal spring member, for example, and is adapted to radially urge the lip tip end portion 36 to the inner periphery side (i.e., the direction of the arrow d) and provide a tightening force with a predetermined magnitude that presses the lip tip end portion 36 against the outer peripheral surface of the rotating shaft. Note that the garter spring 38 is not limited to the one made of metal and may be the one made of a variety of other materials, such as resin, as long as the garter spring 38 can provide a tightening force.

The protective ring 40 is an annular metal member having the axis x as the center or the approximate center as illustrated in FIG. 1. Examples of a metal member used for the protective ring 40 include stainless steel and SPCC (cold rolled steel sheet). The protective ring 40 is produced by subjecting such a metal member to press work or forging, for example. The protective ring 40 includes the protective ring tubular portion 41, a protective ring disk portion 42, and the engagement portion 43. The protective ring tubular portion 41 of the protective ring 40 is fitted to the inner periphery side d of the reinforcement ring tubular portion 21 of the reinforcement ring 20 from the other side (i.e., in the direction from the exterior side a to the interior side b).

The protective ring tubular portion 41 is a tubular portion having a cylindrical or approximately cylindrical shape and extending in the direction of the axis x, for example. The protective ring tubular portion 41 is formed such that it can be fitted to an inner peripheral surface 211 of the reinforcement ring tubular portion 21 in the sealing device 1, more specifically, to an inner peripheral surface 321 of the gasket portion 32 of the elastic portion 30 by contacting the inner peripheral surface. The protective ring tubular portion 41 may be shaped such that its middle portion has a conical ring portion (not illustrated) formed thereon. Alternatively, the protective ring tubular portion 41 may be fitted to the inner peripheral surface 211 of the reinforcement ring tubular portion 21 by at least partially and directly contacting the inner peripheral surface 211. The protective ring tubular portion 41 is, when the sealing device 1 is fitted to the inner peripheral surface of the through-hole, fitted onto the inner peripheral surface 211 of the reinforcement ring tubular portion 21 such that the axis x of the sealing device 1 coincides with the axis x of the protective ring 40.

The protective ring disk portion 42 is a hollow disk-like portion extending from the other side of the protective ring tubular portion 41, that is, from an end portion on the exterior side a to the inner periphery side d. The protective ring disk portion 42 is arranged such that it faces the exterior side a when the protective ring 40 is attached to the inner peripheral surface 211 of the reinforcement ring tubular portion 21 of the reinforcement ring 20.

The engagement portion 43 is provided on the protective ring tubular portion 41 of the protective ring 40 in the sealing device 1. The engagement portion 43 is provided on the outer peripheral surface 411 of the protective ring tubular portion 41 as a surface to be fitted to the elastic portion 30, specifically, the inner peripheral surface 321 that is a portion of the gasket portion 32 on the inner periphery side. The engagement portion 43 is formed in a recessed groove shape on the outer peripheral surface 411 of the protective ring tubular portion 41, for example. The engagement portion 43 may be provided in an annular shape in the circumferential direction of the protective ring tubular portion 41 of the protective ring 40. Alternatively, the engagement portion 43 may be provided at a plurality of positions in a scattered manner in the circumferential direction of the protective ring tubular portion 41 of the protective ring 40.

The engagement portion 43 includes, on the outer peripheral surface 411 of the protective ring tubular portion 41, an inclined surface 431 having a diameter that decreases in the direction from the exterior side a to the interior side b, and also includes, on the outer peripheral surface 411 of the protective ring tubular portion 41, an upstanding wall portion 432 facing the other side, that is, the exterior side a. The upstanding wall portion 432 is provided upright so as to extend in the radial direction perpendicular to the direction of the axis x. That is, the upstanding wall portion 432 extends to a side opposite to the side along the direction from the interior side b to the exterior side a that is the direction in which the protective ring 40 would come off the sealing device 1 along the direction of the axis x.

Next, the function of the sealing device 1 with the aforementioned configuration will be described.

Figure 3:
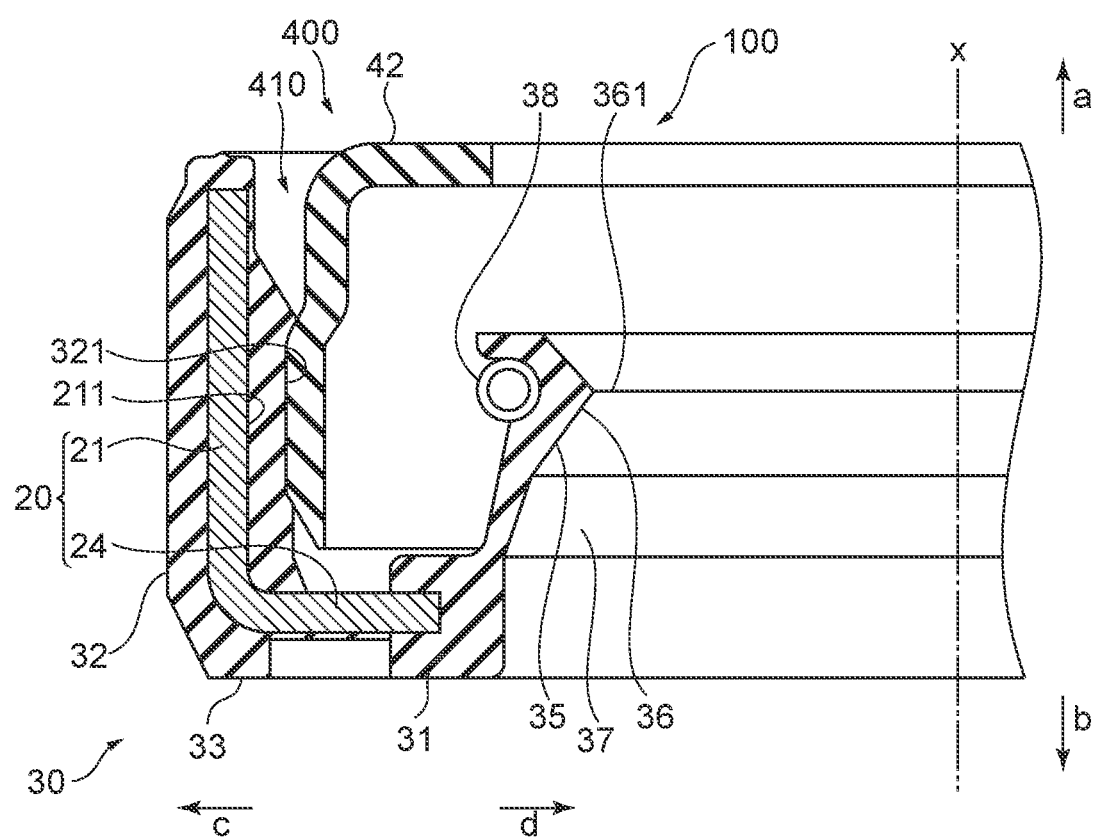
FIG. 3 is a sectional view of a cross-section along the axis for illustrating the schematic configuration of a sealing device as a reference example.

FIG. 3 is a sectional view of a cross-section along the axis for illustrating the schematic configuration of a sealing device as a reference example. As illustrated in FIG. 3, a sealing device 100 according to the reference example does not include the engagement portion 43, such as the one included in the sealing device 1, in a protective ring tubular portion 410 of a protective ring 400.

In the sealing device 100 according to the reference example with such a configuration, there may be a case where the protective ring 400 is displaced from a predetermined position when a greater-than-expected external force is applied to the protective ring 400.

Meanwhile, in the sealing device 1 according to the present embodiment, as illustrated in FIG. 2, the protective ring 40 is fitted to the inner periphery side d of the reinforcement ring tubular portion 21 from the exterior side a that is the other side in the direction of the axis x in the usage state of the sealing device 1. Herein, the engagement portion 43 engages with the inner peripheral surface 321 provided on the inner periphery side of the gasket portion 32.

In the usage state of the sealing device 1, the engagement portion 43 of the protective ring 40 includes the upstanding wall portion 432 facing the other side, that is, the exterior side a on the outer peripheral surface 411 of the protective ring tubular portion 41. The upstanding wall portion 432 is provided upright in the radial direction perpendicular to the direction of the axis x. Therefore, the upstanding wall portion 432 extends to a side opposite to the side along the direction from the interior side b to the exterior side a that is the direction in which the protective ring 40 would come off the sealing device 1 along the direction of the axis x.

As described above, according to the sealing device 1 with the engagement portion 43, when a force acting toward the exterior side a is applied to the protective ring 40, the upstanding wall portion 432 of the engagement portion 43 bites into the inner peripheral surface 321 of the gasket portion 32 of the elastic portion 30. Therefore, the protective ring 40 becomes less likely to come off the sealing device 1. Thus, according to the sealing device 1, the displacement of the protective ring 40 can be suppressed.

Other Embodiments

Although an embodiment of the present disclosure has been described above, the present disclosure is not limited to the sealing device 1 according to the aforementioned embodiment, and includes all aspects encompassed by the concept and the claims of the present disclosure. In addition, the aforementioned configurations may be selectively combined as appropriate so as to achieve at least some of the aforementioned object and effects. For example, the shape, material, arrangement, size, and the like of each component in the aforementioned embodiment may be changed as appropriate depending on a specific usage pattern of the present disclosure.

For example, in the sealing device 1, the upstanding wall portion 432 of the engagement portion 43 is not limited to the one that extends upward in the radial direction perpendicular to the direction of the axis x as illustrated in FIGS. 1 and 2 as long as the upstanding wall portion 432 of the engagement portion 43 can bite into the inner peripheral surface 321 of the gasket portion 32 of the elastic portion 30. The upstanding wall portion 432 may also be the one that extends upward to the exterior side a with respect to the radial direction, for example.

For example, in the sealing device 1, the elastic portion 30 may include a dust lip that extends from the base portion 31 to the inner periphery side (i.e., the direction of the arrow d) and to the exterior side (i.e., the direction of the arrow a) in the direction of the axis x and that has a tip end portion with a diameter that decreases toward the inner periphery side d in the direction of the axis x.

For example, in the sealing device 1, the protective ring 40 may include, on an end portion of the protective ring disk portion 42 on the inner periphery side d, a second lip portion formed of an elastic material and having a tip end portion that is formed to allow the outer peripheral surface of a rotating shaft (not illustrated) to be slidable thereon.

The invention claimed is:

1. A sealing device comprising:
   an annular reinforcement ring around an axis;
   an annular elastic portion around the axis, the annular elastic portion being attached to the annular reinforcement ring, being formed of an elastic material, and including a lip portion; and
   an annular protective ring around the axis, the annular protective ring being adapted to be fitted to an inner periphery side of the annular reinforcement ring,
   wherein the annular reinforcement ring includes a reinforcement ring tubular portion formed in a tubular shape around the axis,
   the annular elastic portion includes a gasket portion attached to the reinforcement ring tubular portion,
   the annular protective ring includes a protective ring tubular portion formed in a tubular shape around the axis, and an engagement portion provided on an outer peripheral surface of the protective ring tubular portion, the engagement portion being adapted to engage with the inner periphery side of the annular reinforcement ring,
   the protective ring tubular portion is configured to be fitted to an inner peripheral surface of the reinforcement ring tubular portion,
   the engagement portion is formed in a recessed groove shape on the outer peripheral surface of the protective ring tubular portion,
   an inner periphery side of the casket portion is embedded in and encased with the engagement portion, and
   the recessed groove includes an upstanding wall portion, an inclined surface, and a portion having a radius of curvature connecting the upstanding wall portion and the inclined surface.

2. The sealing device according to claim 1, wherein the annular reinforcement ring includes a reinforcement ring disk portion extending from one end portion of the reinforcement ring tubular portion in a direction of the axis toward an inner periphery side, and
   the annular protective ring is adapted to be fitted to the inner periphery side of the reinforcement ring tubular portion from a side of another end portion of the reinforcement ring tubular portion in the direction of the axis.

3. The sealing device according to claim 1, wherein the engagement portion includes the upstanding wall portion on the outer peripheral surface of the protective ring tubular portion, the upstanding wall portion facing another side, and
   the upstanding wall portion is provided upright in a radial direction perpendicular to the direction of the axis.

* * * * *